United States Patent [19]

Del Medico

[11] Patent Number: 4,562,353
[45] Date of Patent: Dec. 31, 1985

[54] METHOD AND DEVICE FOR PRODUCING NUCLEAR IMAGES

[75] Inventor: Anthony P. Del Medico, Niles, Ill.

[73] Assignee: Siemens Eammasonics, Inc., Des Plaines, Ill.

[21] Appl. No.: 616,984

[22] Filed: Jun. 4, 1984

[51] Int. Cl.⁴ .............................................. G01T 1/20
[52] U.S. Cl. ............................. 250/363 S; 250/505.1
[58] Field of Search ............... 250/363.2, 363.3, 363.4, 250/363.6, 363.7, 363.9, 369, 505.1; 378/149

[56] References Cited

U.S. PATENT DOCUMENTS

| | | |
|---|---|---|
| 3,970,852 | 7/1976 | Richey et al. . |
| 4,012,636 | 3/1977 | Engdahl et al. . |
| 4,424,447 | 1/1984 | Lelong et al. ................. 250/363 SE |
| 4,435,838 | 3/1984 | Gourlay ......................... 250/363 SB |

FOREIGN PATENT DOCUMENTS

| | | |
|---|---|---|
| 0047177 | 3/1982 | European Pat. Off. . |
| 2623714 | 12/1976 | Fed. Rep. of Germany ...... 250/363 SE |
| 129779 | 10/1980 | Japan ............................. 250/363 SE |

*Primary Examiner*—Janice A. Howell
*Attorney, Agent, or Firm*—Mark H. Jay

[57] ABSTRACT

A method and device for producing nuclear images of an object under investigation which emits nuclear radiation, wherein the object is scanned along a scan axis by means of a radiation detector having a radiation detector field of view. The radiation detector field of view is masked by means of a mask field of view which partially exceeds the radiation detector field of view along the scan axis. The loss of sensitivity perpendicular to the scan axis in the parts of the mask field of view which exceed the radiation detector field of view is compensated by applying a weighting function proportional to the inverse of the incremental area along the scan axis bounded by the radiation detector field of view.

20 Claims, 11 Drawing Figures

METHOD AND DEVICE FOR PRODUCING NUCLEAR IMAGES

BACKGROUND OF THE INVENTION

1. Field of the Invention

The invention relates to a method and device for producing nuclear images by means of a radiation detector. In particular, the invention relates to a method and device for producing nuclear images by means of a scintillation gamma camera.

2. Description of the Prior Art

Scintillation cameras are widely used for producing nuclear images of a patient under examination. Of particular interest are whole-body images of the patient. Whole-body imaging is performed either by a linear scanning movement of the scintillation gamma camera along a patient table, or by a linear scanning movement of the patient tably whereby the camera is kept stationary, or a mixture of both movements. Scanning is performed in one or more passes along a scan axis. For data acquisition and imaging a mask field of view is produced by masking the camera's field of view either electronically or mechanically.

The possibility of mechanically masking is for example illustrated in U.S. Pat. No. 4,012,636 (Engdahl et al.)

The U.S. Pat. No. 3,970,852 (Richey et al.) and the European Patent Application 0,047,177 (Inbar) describe examples for electronically masking.

In all three cases the mask field of view lies within the boundaries of the (circular) camera's field of view.

The European Patent Application 0,047,177 also describes a method and circuit for correcting non-uniform scanning time interval distribution generated by a mask field of view along an axis perpendicular to the scan axis. However, the correction factors are predetermined in off-line measurements in accordance with the activity distribution of a known reference radiation field.

SUMMARY OF THE INVENTION

Objects

It is an object of this invention to provide a method and device for producing nuclear images having an increased scan acquisition sensitivity with respect to the prior art.

It is another object of this invention to provide a method and device for producing nuclear images which allow for compensation of the loss of sensitivity perpendicular to the scan axis in on-line without making use of a known reference radiation field.

Summary

According to this invention an improved method for producing nuclear images of an object under examination which emits nuclear radiation, is provided, which comprises the steps of:

(a) scanning the object along a scan axis by means of a radiation detector having a radiation detector field of view;

(b) masking the radiation detector field of view by means of a mask field of view which partially exceeds the radiation detector field of view along the scan axis; and (c) compensating the loss of sensitivity perpendicular to the scan axis in the parts of the mask field of view which exceed the radiation detector field of view by applying a weighting function proportional to the inverse of the incremental area along the scan axis bounded by the radiation detector field of view.

Also according to this invention an improved device for producing nuclear images of an object under examination which emits nuclear radiation, is provided, which comprises (a) means for scanning the object along a scan axis by means of a radiation detector having a radiation detector field of view;

(b) means for masking the radiation detector field of view by means of a mask field of view which partially exceeds the radiation detector field of view along the scan axis; and (c) means for compensating the loss of sensitivity perpendicular to the scan axis in the parts of the mask field of view which exceed the radiation detector field of view by applying a weighting function proportional to the inverse of the incremental area along the scan axis bounded by the radiation detector field of view.

According to the invention an improvement in sensitivity can be achieved by increasing the size of the mask's field of view to cover at least approximately the entire field of view of the radiation detector. The resulting sensitivity loss in the areas bounded by the radiation detector's field of view can be compensated by simply making use of the known areas of both the radiation detector field of view and the mask field of view. Predetermination of correction factors by means of a known reference field is not necessary.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENT

Figure 1:
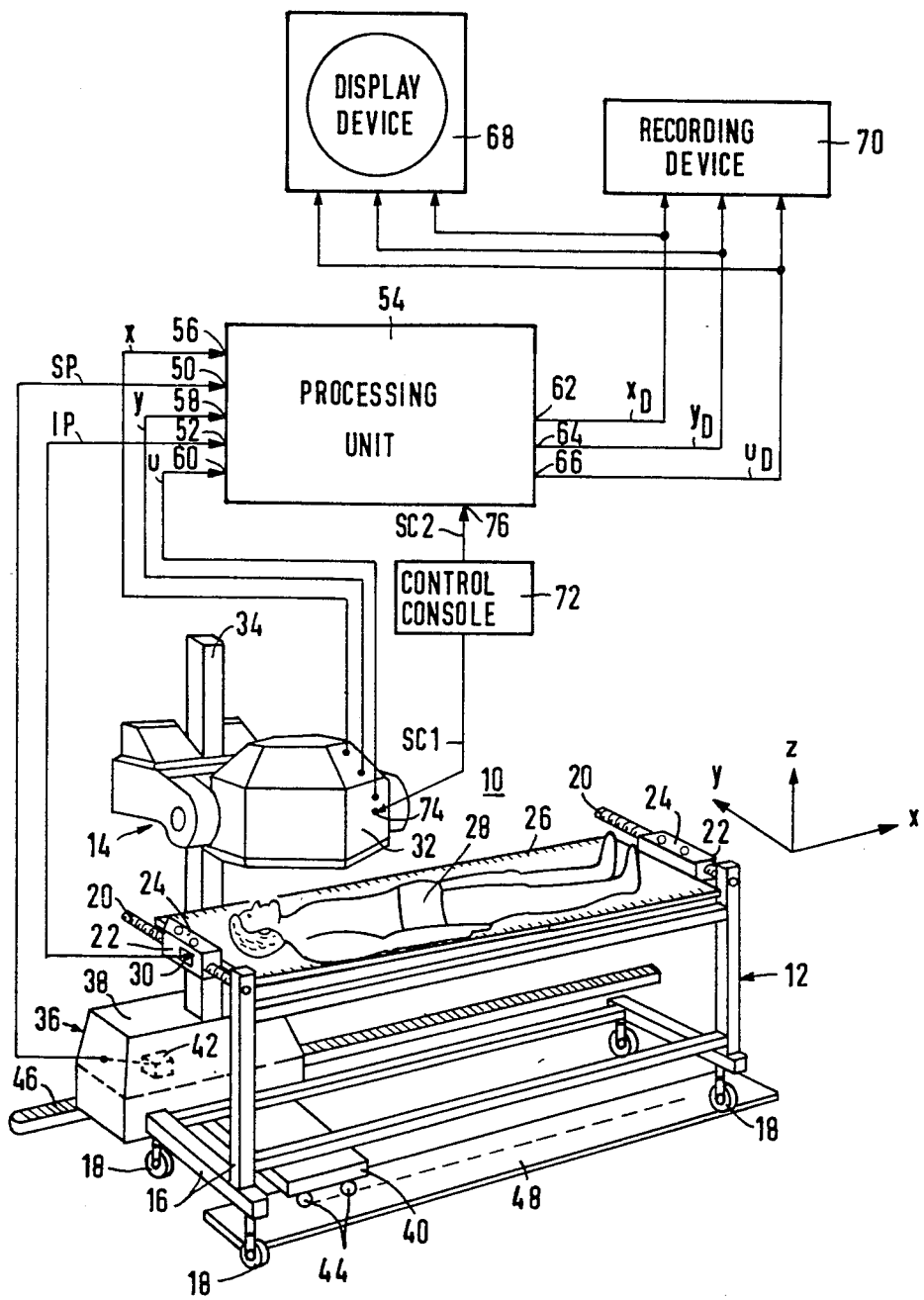
FIG. 1 is an overview of a whole-body scanning apparatus for producing nuclear images according to the invention.

In FIG. 1, an embodiment of a whole-body scanning apparatus 10 for gamma radiation is illustrated. The whole-body scanning apparatus 10 comprises a movable patient supporting table 12 and a movable scintillation gamma camera system 14.

The patient supporting table 12 contains a conventional frame work 16 which is supported by wheels 18. The frame work 16 has attached thereto two horizontal guiding rails 20 arranged parallel to each other and having free outer rods. On these rails 20 sliding members 22 are arranged. On the sliding members 22 z-shaped plates 24 are mounted. These plates 24 support a table top 26. Due to the sliding members 22, the table top 26 is movable in the y-direction of an orthogonal coordinate system x, y, z. The longitudinal axis of the table top 26 extends in the x-direction. The table top 26 is designed for carrying a patient 28.

One of the sliding members 20 contains a position encoder generally designated by 30. This position encoder 30 issues a signal IP which is a measure of the table top position with respect to the y-direction. The encoder 30 is of conventional design.

The movable scintillation camera system 14 contains a conventional scintillating gamma camera 32, which is movably attached to a vertical column 34. The column 34 is supported by a stand 36 which includes a box-shaped housing 38 and a horizontally extending foot 40 firmly attached thereto. The stand 36 is movable in x-direction, that is perpendicularly to the moving direction of the table top 26. To this end, it contains (not illustrated) a driving motor, a gear system, and a motor control device. The stand 36 also comprises a stand position sensor 42, the output signal SP of which is representative of the stand position with respect to the x-direction. Any suitable position sensor 42 applicable for sensing the position of a linear movement can be used.

In order to perform a strictly horizontal movement in x-direction, the lower portion of the housing 38 and the lower outer portion of the foot 40 contain a sprocket (not visible in FIG. 1) and wheels 44, respectively.

The sprocket is driven by the motor contained in the housing 38. It engages a rack 46 in x-direction which is mounted on the floor of the examination room. The wheels 44 roll on a flat plate 48, which is also mounted on the floor of the examination room.

The signal SP representing the stand position and the signal IP representing the table top position are transmitted to first and second inputs 50, 52 of a processing unit 54. In addition, coordinate signals x, y and unblank signals u issued by the camera 32 are supplied to third, fourth and fifth inputs 56, 58, 60 of the processing unit 54. At first, second and third outputs 62, 64, 66 of the processing unit 54, output coordinate signals $x_D$, $y_D$ and unblank signals $u_D$ are furnished.

The coordinate signals $x_D$ and $y_D$ and unblank signals $u_D$ are transmitted to a display device 68 (e.g. scope). The unblank signals $u_D$ enable image points to be displayed on screen locations determined by the $x_D$ and $y_D$ coordinate signals. The coordinate signals $x_D$, $y_D$ and unblank signals $u_D$ are also transmitted to a recording device 70 for image storage purposes.

The block 72 comprises a conventional control console for the scintillation gamma camera 32 and the processing unit 54. Control signals SC1 are supplied from control console 72 to the scintillation gamma camera 32 via camera input 74. Also control signals SC2 are furnished from control console 72 to the processing unit via sixth input 76.

In an examination of the patient 28, the table top 26 is first brought into a desired table position. Then the motor contained in the housing 38 works on the rack 46 via the sprocket, thereby shifting the stand 36 and the column 34 including the scintillation gamma camera 32 in x-direction. As a result, the camera 32 scans along the longitudinal direction of the patient 28 (linear whole body scan), and images are taken. When such a longitudinal pass along the patient 28 is completed, the table top 26 can laterally be moved in y-direction, and a second scanning pass parallel to the first pass can commence, if necessary.

According to this invention an electronically generated mask field of view is provided for the scintillation gamma camera 32 which partially exceeds the radiation detector field of view along the scan-axis (x-axis). This is illustrated in more detail in the diagram of FIG. 2.

Figure 2:
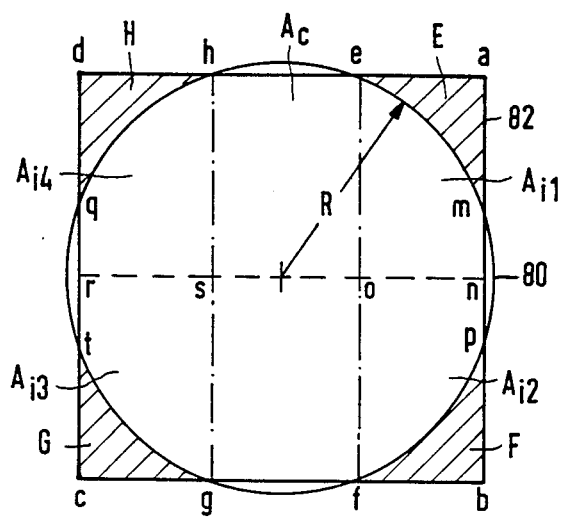
FIG. 2 is a diagram showing the relationship between the radiation detector field of view and a mask field of view according to this invention.

According to FIG. 2 the scintillation gamma camera 32 comprises a circular radiation detector field of view 80 having the radius R. The mask field of view 82 bounded by a, b, c, d is rectangular. It makes approximately use of the full field of view 80 of the scintillation gamma camera 32. The mask field of view 82 is not made tangent to the circular camera field of view 80 so that some degree of adjustment for alignment is available.

The mask field of view 82 according to FIG. 2 comprises a central area $A_c$ bounded by e, f, g, h. Information from this area $A_c$ always has uniform distribution.

The mask field of view 82 also includes incremental areas $A_{i1}$ (bounded by e, m, n, o), $A_{i2}$ (bounded by f, p, n, o), $A_{i3}$ (bounded by g, t, r, s), $A_{i4}$ (bounded by h, q, r, s) and hatched corner areas E, F, G, H. The incremental areas are equal $A_{i1} = A_{i2} = A_{i3} = A_{i4} = A_i$. The complete effective area $(A_c + 4A_i)$ which is larger than comparable areas of the prior art increases the effective sensitivity considerably with respect to the prior art.

However, the corner areas E, F, G, H which lie outside the camera's field of view 80 will cause a sensitivity loss for data along the y-axis which are beyond $$\gamma R = \sqrt{R^2 - \left(\frac{a-b}{2}\right)^2}.$$

The correction of the sensitivity loss for y-axis values between $\gamma R$ and the boundary of the mask field of view 82 will be normalized in the image exposure by applying a weighting function proportional to the inverse of an incremental area $A_i$ along the x-axis (scan axis).

In an analog system the weighting function can be implemented by pulse width modulating the unblank pulses.

For digital acquisition the add one event per pixel can be weighted to perform the correction.

Since the correction is a function of the incremental area $A_i$ along the x-axis, the correction values can be determined by taking the first derivative of the area. That is:

$$d/dy \, A_i = d/dy \int \sqrt{R^2 - y^2} \, dy \quad (1)$$

which gives $$x = \sqrt{R^2 - y^2} \quad (2)$$

For normalizing as a function of y, one can set $$y = kR \text{ with } 0 \leq k \leq 1 \quad (3)$$

and $$\frac{y}{R} = \sqrt{1 - k^2} \quad (4)$$

Plotting the inverse of (4) will then yield the desired normalization values.

$$C = \frac{1}{\frac{y}{R}} = \frac{1}{\sqrt{1 - k^2}} \quad (5)$$

C is the normalization coefficient as a function of the y value along the y axis.

The following table illustrates the normalization coefficient C dependent on different k values, the different discrete C values at different discrete $k_i$ are generally designated with $C_i$:

| k | C |
|---|---|
| 0 | 1 |
| 0.05 | 1.001 |
| 0.10 | 1.005 |
| 0.15 | 1.011 |
| 0.20 | 1.021 |
| 0.25 | 1.033 |
| 0.30 | 1.048 |
| 0.35 | 1.068 |
| 0.40 | 1.091 |
| 0.45 | 1.119 |
| 0.50 | 1.155 |
| 0.55 | 1.197 |
| 0.60 | 1.250 |
| 0.65 | 1.315 |
| 0.70 | 1.400 |
| 0.75 | 1.512 |
| 0.80 | 1.666 |
| 0.85 | 1.898 |
| 0.90 | 2.294 |
| 0.95 | 3.202 |
| 1.00 | ∞ |

Figure 3:
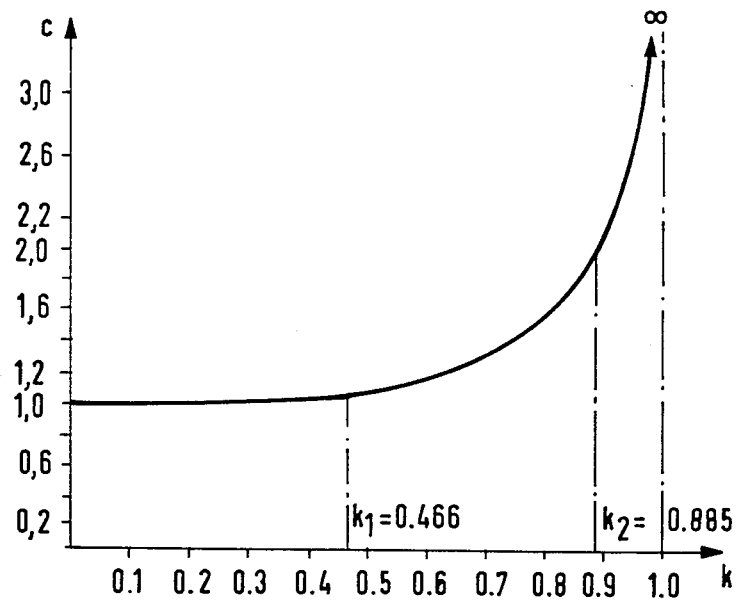
FIG. 3 is a graph showing the normalization coefficient as a function of the normalized y value $k=y/R$ along the y-axis.

The corresponding graph C(k) is illustrated in FIG. 3.

According to the graph of FIG. 3 the corection will be applied between the boundary values of $k_1$ and $k_2$.

For values of $k \leq k_1$, the value of C will be held constant at the boundary condition of $k_1$. This is necessary since the area between $k=0$ and $k=k_1$ is constant and bounded by the edge of the mask field of view 82.

For values of $k \geq k_2$, there will not be any image data since the values are outside the mask field of view 82.

Figure 4:
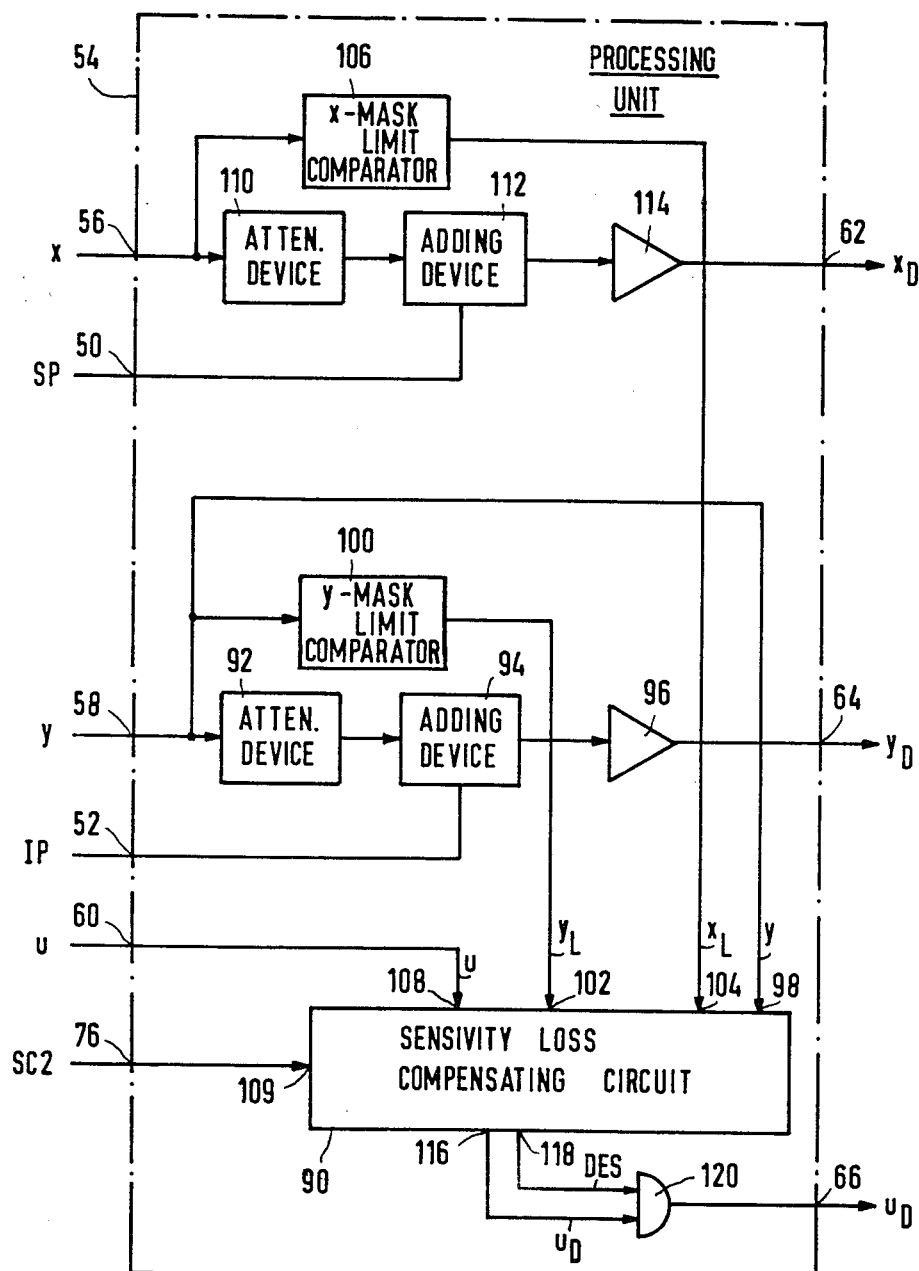
FIG. 4 is a more detailed block circuit diagram of the processing unit shown in FIG. 1.

FIG. 4 illustrates a more detailed block circuit diagram of the processing unit 54 of FIG. 1 comprising a sensitivity loss compensating circuit 90 for the y coordinate signal.

According to FIG. 4 the y coordinate signal is delivered from input 58 to output 64 of the processing unit 54 via an attenuating device 92 for scaling of the y coordinate signal, an adding device 94 for adding the signal IP at input 52 and an amplifier 96. The output signal at output 64 is the coordinate signal $y_D$. The y coordinate signal at input 58 of the processing unit 54 is also furnished to the sensitivity loss compensating circuit 90 via a first input 98. Furthermore, the y coordinate signal is supplied to a y mask limit comparator 100, the output of which (output signal $y_L$) is connected with a second input 102 of the sensitivity loss compensating circuit 90.

The sensitivity loss compensating circuit 90 also comprises a third input 104 which is connected with the output of a x mask limit comparator 106 for the x signal at input 56 of the processing unit 54. Furthermore, it includes a fourth input 108 which is connected with the input 60 of the processing unit 54 for the unblank signals u. Finally, the sensitivity loss compensating circuit 90 contains a fifth input 109 for the control signal SC2 at input 76.

The x coordinate signal at input 56 of the processing unit 54 is also supplied to output 62 of the processing unit 54 via an attenuating device 110 for scaling of the x coordinate signal, an adding device 112 for adding the signal SP at input 50 and an amplifier 114. The output signal at output 62 is the coordinate signal $x_D$.

The x and y mask limit comparators are of conventional design for electronically masking.

The sensitivity loss compensating circuit 90 contains a first and second outputs 116 and 118 which are connected via a gate 120 with the output 66 of the processing unit 54. Thus the output signal of gate 120 is the unblank signal $u_D$.

Figures 5, 6:
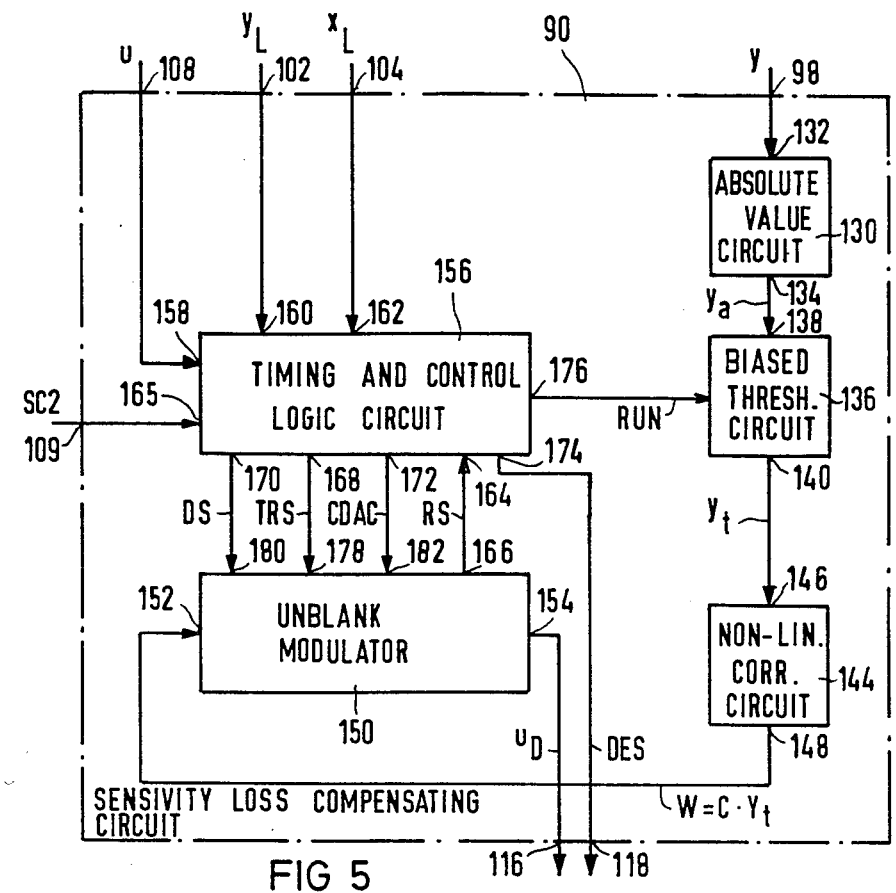
FIG. 5 is a first embodiment of the sensitivity loss compensating circuit shown in FIG. 4.
FIG. 6 is a second embodiment of the sensitivity loss compensating circuit shown in FIG. 4.
Figure 8:
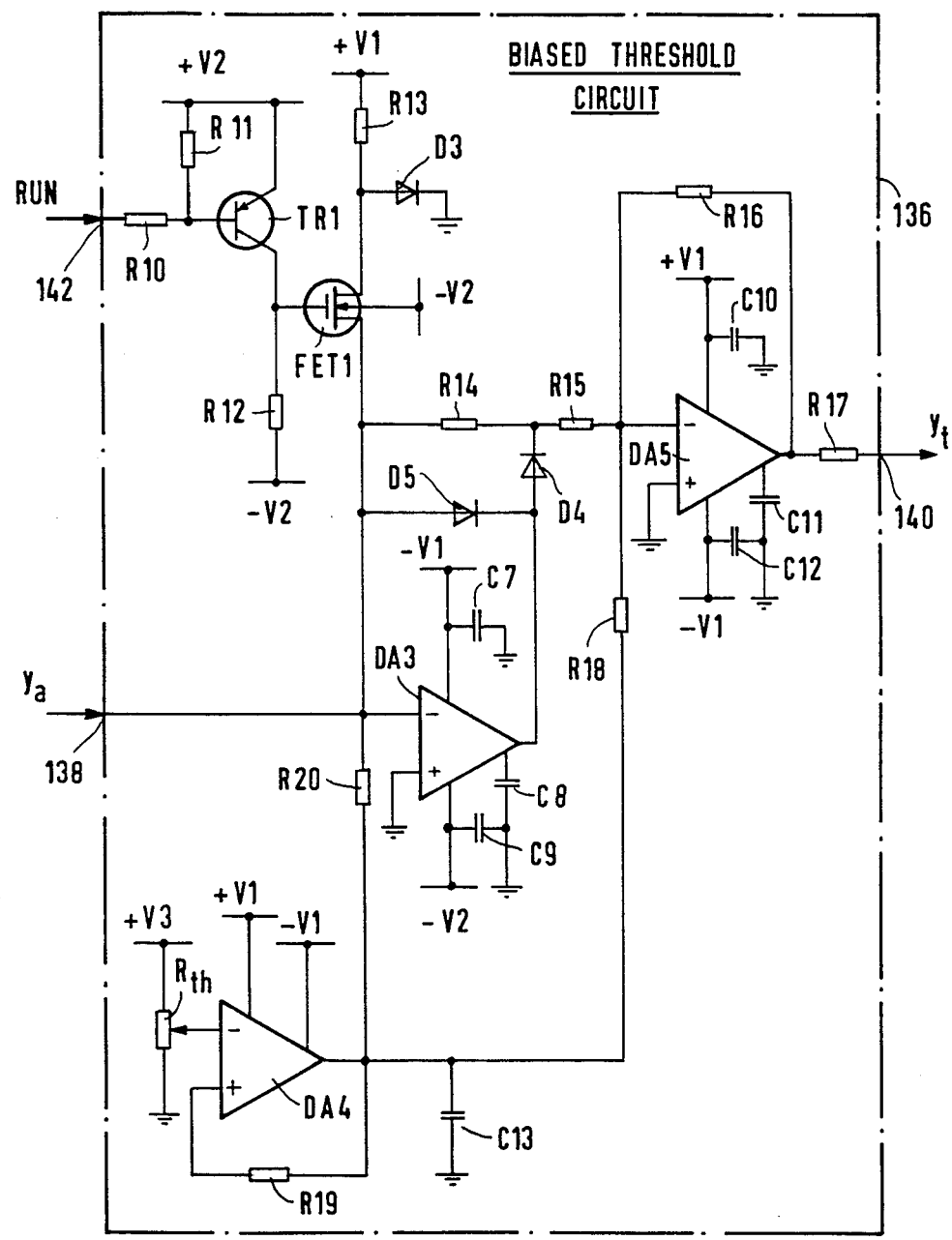
FIG. 8 is a detailed circuit diagram of the biased threshold circuit inthe embodiment of the sensitivity loss compensating circuit shown in FIG. 5.

FIG. 5 illustrates a first (analog) embodiment of the sensitivity loss compensating circuit 90 of FIG. 4 in more detail. According to FIG. 5 the y position coordinate signal is first applied to an absolute value circuit 130 via input 132 such that the (bipolar) y position coordinate signal will always produce a negative signal $y_a$ at output 134. The $y_a$ signal is then applied to a biased threshold circuit 136 via first input 138 which produces a constant output voltage $y_t$ at output 140 for values of $y_a \leq k_1$ as adjusted by an ohmic potentiometer $R_{th}$ (FIG. 8). For values of $y_a > k_1$, $y_t$ will equal $y_a$. The biased threshold circuit also comprises a second input 142 for a so-called "RUN" signal.

The output signal $y_t$ of the biased threshold circuit 136 is then applied to a non-linear correction circuit 144 via input 146. The non-linear correction circuit 144 multiplies $y_t$ by the normalization factors $C_i$ to produce a signal $W = C \cdot y_t$ according to the correction curve shown in FIG. 3 at output 148. The signal W is fed to an unblank modulator 150 via input 152.

The unblank modulator 150 comprises a sample and hold device which stores the value of signal W and is then discharged by the output current of an 8 bit digital-to-analog converter. This is illustrated in more detail in FIG. 10. The resulting pulse width of unblank signal $u_D$ at output 154 of the unblank modulator 150 is then proportional to each correction coefficient $C_i$ multiplied by a programmed intensity level represented by the discharge current of the digital-to-analog converter.

The sensitivity loss compensating circuit 90 also includes a timing and control logic circuit 156. The timing and control logic circuit 156 comprises a first input 158 for the unblank signals u. It also includes second and third inputs 160, 162 for the output signals $y_L$, $x_L$ of the y and x mask limit comparators 100 and 106. Finally it contains a fourth input 164 for a reset signal RS of the unblank modulator 150 and a fifth input 165 for the control signal SC2 at input 109 of the sensitivity loss compensating circuit 90. The reset signal RS is generated at a second output 166 of the unblank modulator 150.

The timing and control logic circuit also comprises a first, second, third, fourth and fifth outputs 168, 170, 172, 174 and 176.

At first output 168 a track signal TRS for charging a capacitor of the sample and hold device inside the unblank modulator 150 (FIG. 10) is generated. The track signal TRS enters the unblank modulator 150 at second input 178. At second input 170 a discharge signal DS for discharging the capacitor of the sample and hold device inside the unblank modulator 150 is produced. The discharge signal DS is supplied to the unblank modulator 150 via a third input 180. At third output 172 control signals CDAC for the digital-to-analog converter inside the unblank modulator 150 are generated. The control signals CDAC enter the unblank modulator 150 at a fourth input 182. At fourth output 174 of the timing and control logic circuit 156 a decision signal DES, whether or not an event lies within the limits of the mask field of view 82 and a fifth output 176 the "RUN" signal is generated.

As illustrated in FIG. 4 the decision signal DES leaving the sensitivity loss compensating circuit 90 at output 118 and the unblank signal $u_D$ leaving the sensitivity loss compensating circuit 90 at output 116 are supplied to gate 120. In case a decision signal DES appears at gate 120 simultaneously with an unblank signal $u_D$ the latter one will pass the gate 120. Due to this the unblank signal $u_D$ leaves the processing unit 54 at output 66 for display or recording purposes.

As mentioned before, the sensitivity loss compensating circuit 90 of FIG. 5 works on analog basis.

A sensitivity loss compensating circuit 90' on digital basis is illustrated in FIG. 6. The sensitivity loss compensating circuit 90' comprises inputs 98', 102', 104', 108', 109' and an output 190. The y position coordinate signal is digitized by a 10 bit analog-to-digital converter 192 along with the normal digitization of the scan signals (not shown here). The resulting 10 bit address data is then applied to a 1K×8 look-up table RAM 194 which has been programmed with the data values to produce the following:

$$y_a = |y|$$

$$y_t = k_i y \begin{vmatrix} k = k_1 \\ k = 0 \end{vmatrix}, y_a \begin{vmatrix} k = 1 \\ k > k_1 \end{vmatrix}$$

$$W = C_i \cdot y_t$$

The resulting output data is then applied to a pixel adder logic circuit 196 for each digitized event. The output data of the pixel adder logic circuit 196 are supplied to an image memory (not shown).

A timing and control circuit for controlling the analog-to-digital converter 192, the look-up table RAM 194 and the pixel adder logic circuit 196 is generally designated with 198.

Figure 7:
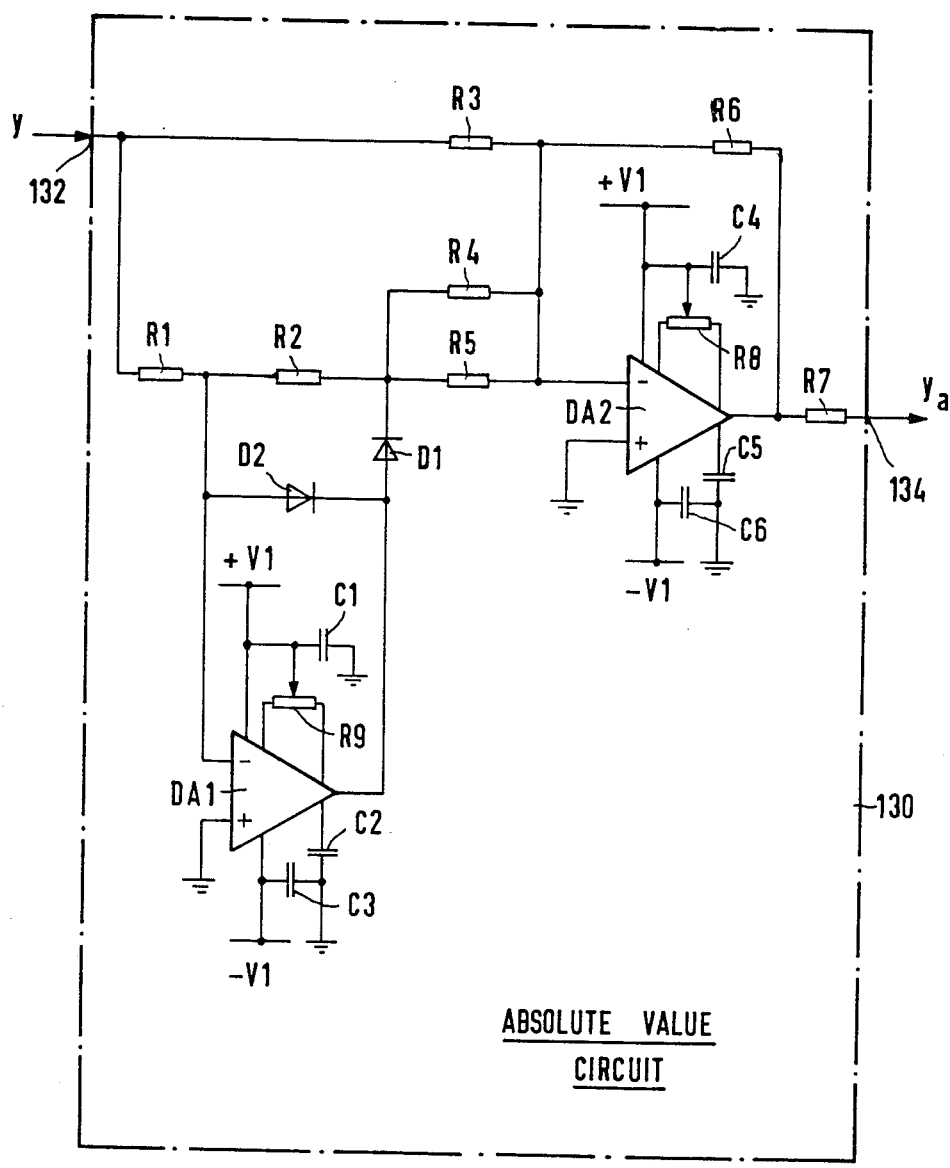
FIG. 7 is a detailed circuit diagram of the absolute value circuit in the embodiment of the sensitivity loss compensating circuit shown in FIG. 5.

FIG. 7 illustrates the absolute value circuit 130 of FIG. 5 in more detail. The elements R1–R9 are ohmic resistances, the elements D1, D2 are diodes, the elements C1–C6 are capacitors and the elements DA1, DA2 are differential amplifiers. ±V1 are supply voltages.

FIG. 8 depicts the biased threshold circuit 136 of FIG. 5 in more detail. The elements R10–R20 are ohmic resistances, the elements D3–D5 are diodes, the elements C1–C6 are capacitors and the elements DA3–DA5 are differential amplifiers. TR1 is a transistor and FET1 is a field effect transistor. $R_{th}$ is the aforementioned potentiometer for the threshold. ±V1, ±V2 and ±V3 are supply voltages.

Figure 9:
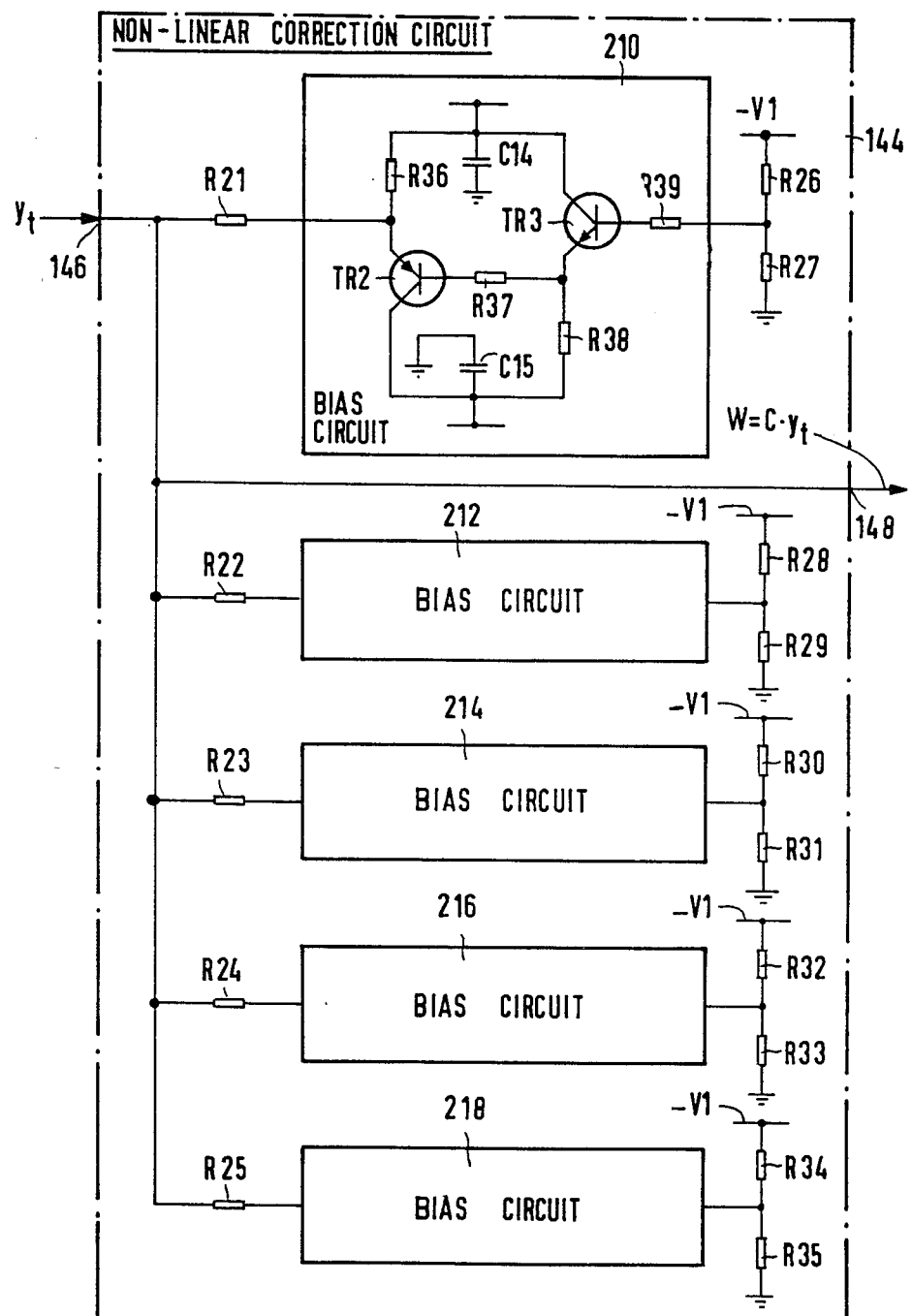
FIG. 9 is a detailed circuit diagram of the non-linear correction circuit in the embodiment of the sensitivity loss compensating circuit shown in FIG. 5.

FIG. 9 shows the non-linear correction circuit 144 of FIG. 5 in more detail. The elements R21–R35 are ohmic resistances, the elements C14 and C15 are capacitors and the elements TR2 and TR3 are transistors. The blocks 210–218 comprise bias circuits, each of which has the structure as shown in block 210. The resistances R26–R35 in combination with the supply voltages −V1 provide the bias voltages for the break points of the function C(k) as illustrated in FIG. 3. The transistors TR2 are responsible for curve approximation between the different discrete points. The different discrete points are given by the ratios of resistor R17 in FIG. 8 and the parallel resistances R21–R25 of the non-linear correction circuit 144 according to FIG. 9.

Figure 10:
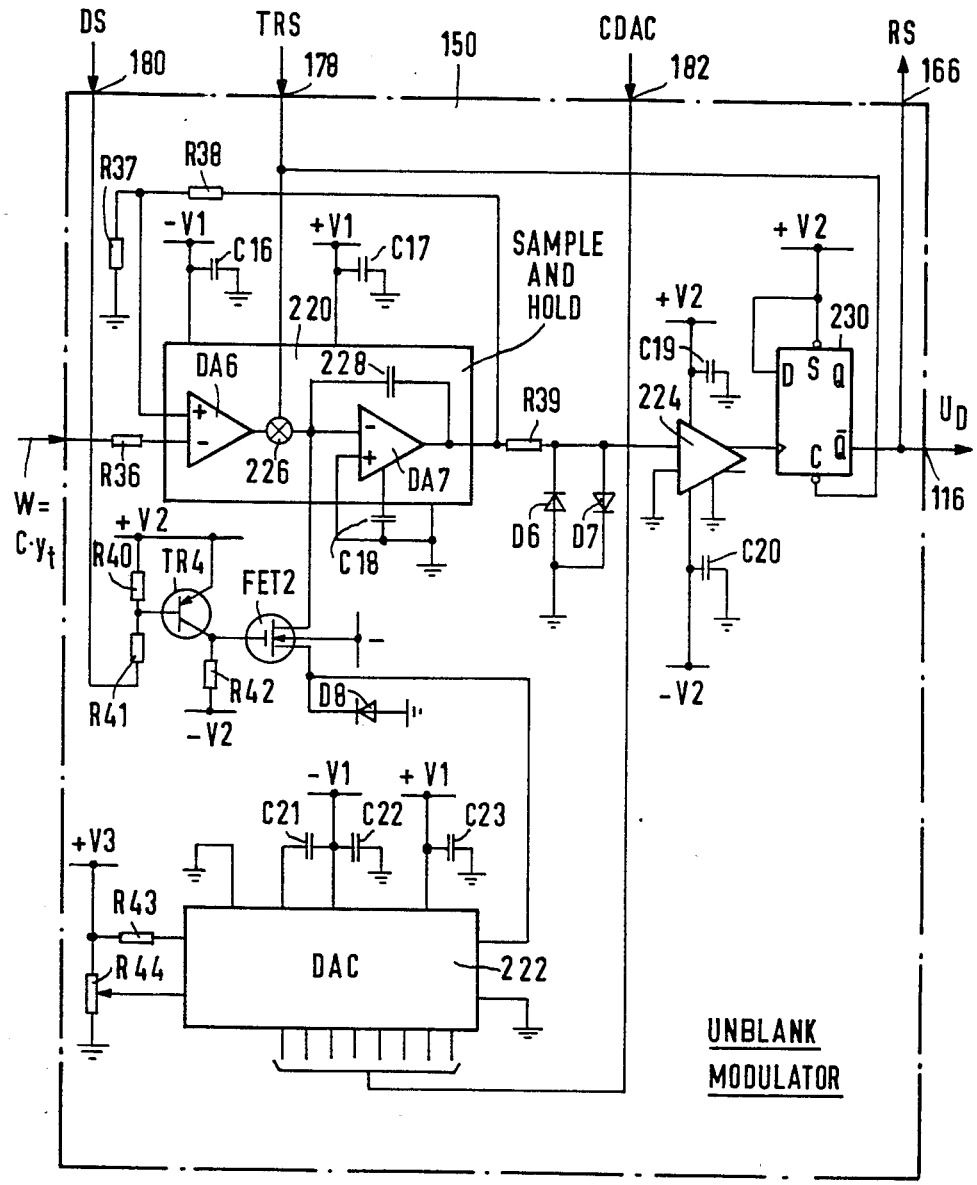
FIG. 10 is a detailed circuit diagram of the unblank modulator in the embodiment of the sensitivity loss compensating circuit shown in FIG. 5.

FIG. 10 illustrates the unblank modulator 50 of FIG. 5 in more detail. The elements R36–R44 are ohmic resistances, the elements C16–C23 are capacitors, the elements D6–D8 are diodes and the elements DA6 and DA7 are differential amplifiers. TR4 is a transistor and FET 2 is a field effect transistor. The aforementioned sample and hold device is generally designated with 220. The previously mentioned digital-to-analog converter is generally designated with 222. The element 224 is a comparator. The elements 226 and 228 inside the sample and hold device 220 are a switch and the aforementioned capacitor, respectively. The element 230 is a D-latch. The track signal TRS switches switch 226 for charging the capacitor 228. Thus the sample and hold device 220 holds the signal W at input 152 of the unblank modulator 150. As soon as a discharge signal DS appears at input 180 of the unblank modulator 150 the capacitor 228 discharges. According to the time of discharging the unblank modulator produces a width modulated unblank pulse $u_D$ via comparator 224 and the D-latch 230. The time of discharge is programmable by means of the digital-to-analog converter 222. This makes it possible to compensate intensity changes in the displayed image. AT the end of a discharge the reset signal RS is generated by D-latch 230 and refed to the timing and control logic circuit 156 for starting a new charge cycle.

Figure 11:
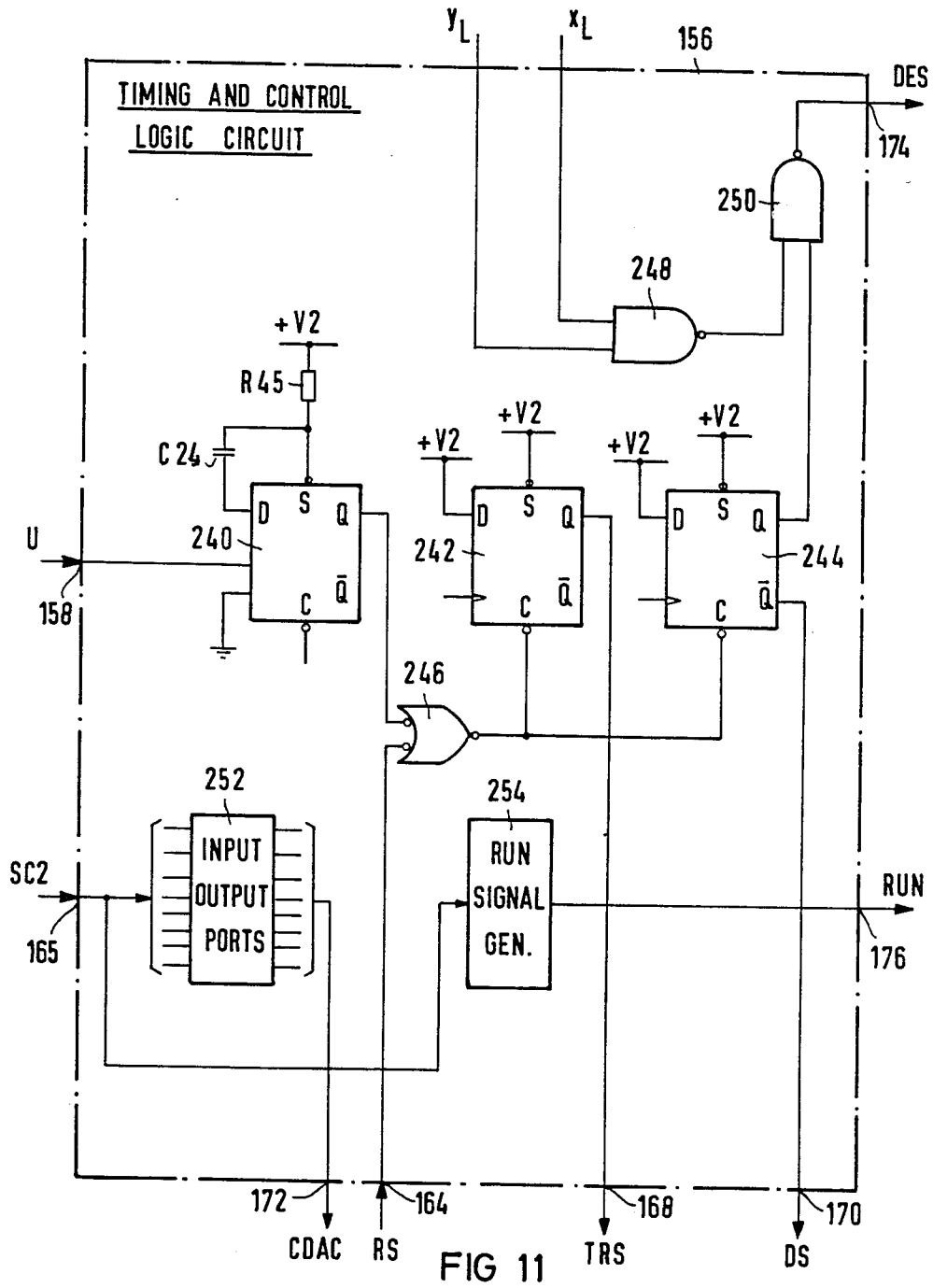
FIG. 11 is a detailed circuit diagram of the timing and control logic circuit in the embodiment of the sensitivity loss compensating circuit shown in FIG. 5.

FIG. 11 finally depicts the timing and control logic circuit 156 of FIG. 5 in more detail. R45 is an ohmic resistance and C24 is a capacitor. The elements 240–244 are D-latches. The elements 246–250 are gates. The block 252 includes input/output ports for the signals SC2 of a microprocessor (not shown) in the control console 72. The output signals of the input/output ports 252 are the control signals CDAC for the digital-to-analog converter 222 in the unblank modulator 150. The block 254 is a generator for the RUN signal.

Having thus described the invention with particular reference to the preferred forms thereof, it will be obvious to those skilled in the art to which the invention pertains, after understanding the invention, that various changes and modifications may be made therein without departing from the spirit and scope of the invention as defined by the claims apended hereto.

What is claimed is:

1. A method for producing nuclear images of an object under investigation which emits nuclear radiation, comprising the steps of:
   (a) scanning the object along a scan axis by means of a radiation detector having a radiation detector field of view;
   (b) masking the radiation detector field of view by means of a mask field of view which partially exceeds the radiation detector field of view along the scan axis; and
   (c) compensating the loss of sensitivity perpendicular to the scan axis in the parts of the mask field of view which exceed the radiation detector field of view by applying a weighting function proportional to the inverse of the incremental area along the scan axis bounded by the radiation detector field of view.

2. The method according to clam 1, comprising the step of masking a circular radiation detector field of view by means of a rectangular mask field of view which approximately makes use of the full circular radiation detector field of view.

3. The method according to claim 2, wherein the rectangular mask field of view is made less than tangent to the circular radiation detector field of view so that some degree of adjustment for alignment is available.

4. The method according to claim 1, wherein the loss of sensitivity is compensated by means of normalization coefficients C as a function of $k=y/R$ along the axis perpendicular to the scan axis, wherein y is the signal perpendicular to the scan axis and R is the radius of a circular radiation detector field of view.

5. The method according to claim 4, wherein $$C(k) = \frac{1}{\sqrt{1-k^2}},$$

with $0 \leq k \leq 1$.

6. A device for producing nuclear images of an object under investigation which emits nuclear radiation, comprising:
   (a) means for scanning the object along a scan axis by means of a radiation detector having a radiation detector field of view;
   (b) means for masking the radiation detector field of view by means of a mask field of view which partially exceeds the radiation detector field of view along the scan axis; and
   (c) means for compensating the loss of sensitivity perpendicular to the scan axis in the parts of the mask field of view which exceed the radiation detector field of view by applying a weighting function proportional to the inverse of the incremental area along the scan axis bounded by the radiation detector field of view.

7. The device according to claim 6, wherein the means for masking the radiation detector field of view comprises a mask limit comparator means.

8. The device according to claim 7, wherein
   (a) the means for scanning the object comprises a scintillation gamma camera as a radiation detector which includes means for generating an x-coordinate signal in direction of the scan axis and a y-coordinate signal in direction perpendicular to the scan axis; and
   (b) the mask limit comparator means comprises a x-mask limit comparator and a y mask limit comparator.

9. The device according to claim 7, wherein the radiation detector comprises a circular field of view and wherein the mask limit comparators means is designated for masking the circular radiation detector field of view by means of a rectangular mask field of view which approximately makes use of the full circular radiation detector field of view.

10. The device according to claim 9, wherein the mask limit comparator means is designated for generating a rectangular mask field of view which is less than tangent to the circular radiation detector field.

11. The device according to claim 6, wherein the means for compensating the loss of sensitivity comprises means for producing normalization coefficients C as a function of $k=y/R$, wherein y is the signal perpendicular to the scan axis and R is the radius of a circular radiation detector field of view.

12. The device according to claim 11, wherein the normalization coefficient producing means producing the coefficients according to the function $$C(k) = \frac{1}{\sqrt{1-k^2}},$$

with $0 \leq k \leq 1$.

13. The device according to claim 12, wherein the normalization coefficient producing means comprising a non-linear correction circuit for generating an output signal which is the product of a signal derived from the signal perpendicular to the scan axis and the normalization coefficient C.

14. The device according to claim 13, wherein the means for compensating the loss of sensitivity further comprising an unblank modulator connected with the non-linear correction circuit for generating unblank signals having pulse widths which are proportional to the normalization coefficients.

15. The device according to claim 13, wherein the means for compensating the loss or sensitivity further comprising
   (a) an absolute value circuit for the signal perpendicular to the scan axis; and
   (b) a biased threshold circuit for the output signal of the absolute value circuit,
   wherein the output signal of the biased threshold circuit is the signal which is intended to be multiplied by the normalization coefficients.

16. The device according to claim 14, wherein the unblank modulator comprises a sample and hold device and a digital-to-analog converter for discharging the sample and hold device.

17. The device according to claim 16, wherein the digital-to-analog converter is designated to discharge the sample-and-hold device at programmable discharge times such as to compensate intensity changes in the displayed image.

18. The device according to claim 13, wherein the non-linear correction circuit comprises for each of a number of discrete points of a curve of normalization coefficients
   (a) a bias circuit having a transistor;
   (b) an input resistance; and
   (c) an output potentiometer;

wherein the output potentiometers provide for different break points the input resistances provide for different discrete points and the transistors of the bias circuits provide for curve approximation between different discrete points of the curve of normalization coefficients.

19. The device according to claim 12, wherein the normalization coefficient producing means comprises a look-up table RAM for the normalization coefficients.

20. The device according to claim 19, wherein the look-up table RAM has an input which is connected with an analog-to-digital converter for the signal perpendicular to the scan axis, and has an output which is connected with a pixel adder logic circuit.

* * * * *